United States Patent
Dai et al.

(10) Patent No.: US 9,325,580 B2
(45) Date of Patent: Apr. 26, 2016

(54) METHOD AND APPARATUS FOR SERVICE CONTROL ON ACCESS NODE

(71) Applicant: Huawei Technologies Co., Ltd., Shenzhen, Guangdong (CN)

(72) Inventors: Xinning Dai, Nanjing (CN); Yiming Wang, Ipswich (GB); Qingfeng Lai, Shenzhen (CN); Xiong Liu, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 60 days.

(21) Appl. No.: 13/899,224

(22) Filed: May 21, 2013

(65) Prior Publication Data

US 2013/0250807 A1    Sep. 26, 2013

Related U.S. Application Data

(63) Continuation of application No. PCT/CN2011/079583, filed on Sep. 13, 2011.

(30) Foreign Application Priority Data

Nov. 26, 2010   (CN) ........................ 2010 1 0562560

(51) Int. Cl.
*H04L 12/28* (2006.01)
*H04L 12/24* (2006.01)
*H04L 29/08* (2006.01)

(52) U.S. Cl.
CPC ............ *H04L 41/12* (2013.01); *H04L 12/2854* (2013.01); *H04L 12/2878* (2013.01); *H04L 12/2885* (2013.01); *H04L 12/2889* (2013.01); *H04L 67/1097* (2013.01)

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS

| 2005/0220120 A1 | 10/2005 | Klausberger et al. |
| 2006/0159008 A1* | 7/2006 | Sridhar ............... H04L 12/2881 370/216 |

(Continued)

FOREIGN PATENT DOCUMENTS

| CN | 1659923 A | 8/2005 |
| CN | 101309197 A | 11/2008 |

(Continued)

OTHER PUBLICATIONS

Written Opinion of the International Searching Authority in corresponding PCT Patent Application No. PCT/CN2011/079583 (Dec. 15, 2011).

(Continued)

*Primary Examiner* — Hassan Phillips
*Assistant Examiner* — Siren Wei
(74) *Attorney, Agent, or Firm* — Leydig, Voit & Mayer, Ltd.

(57) ABSTRACT

Embodiments of the present invention provide a method and an apparatus for service control on an access node, where the access node is divided into at least one access node control protocol ANCP partition, and each ANCP partition corresponds to one network access server NAS. The method includes: obtaining, according to a set rule, a logical identifier of a physical object managed by an ANCP partition, where each logical identifier is used for identifying one physical object, and saving an obtained logical identifier in the ANCP partition; and obtaining, according to the logical identifier in the ANCP partition, an access topology of the physical object managed by the ANCP partition, and reporting the access topology in the ANCP partition to a corresponding NAS, so that the corresponding NAS performs service control according to a reported access topology.

14 Claims, 5 Drawing Sheets

(56) References Cited

U.S. PATENT DOCUMENTS

| | | | | |
|---|---|---|---|---|
| 2008/0219172 | A1* | 9/2008 | Mohan | H04L 12/2602 370/241.1 |
| 2008/0285465 | A1* | 11/2008 | Yang | H04L 41/06 370/241 |
| 2009/0161677 | A1* | 6/2009 | Zheng | H04L 12/2869 370/392 |
| 2010/0017539 | A1 | 1/2010 | Heiles et al. | |
| 2010/0238837 | A1 | 9/2010 | Zheng | |
| 2011/0235635 | A1* | 9/2011 | Yadav | H04L 12/18 370/390 |

FOREIGN PATENT DOCUMENTS

| | | |
|---|---|---|
| CN | 101399681 A | 4/2009 |
| CN | 101453415 A | 6/2009 |
| CN | 101494607 A | 7/2009 |
| CN | 101499951 A | 8/2009 |
| CN | 101741695 A | 6/2010 |
| CN | 101873670 A | 10/2010 |
| CN | 102143055 A | 8/2011 |
| EP | 1494391 A1 | 1/2005 |
| EP | 1962453 A1 | 8/2008 |
| EP | 1978697 A1 | 10/2008 |
| EP | 2405610 A1 | 1/2012 |

OTHER PUBLICATIONS

International Search Report in corresponding PCT Patent Application No. PCT/CN2011/079583 (Dec. 15, 2011).
Chinese Search Report in corresponding Chinese Patent Application No. 2010105625608 (Jan. 29, 2013).
Wadhwa et al., "Protocol for Access Node Control Mechanism in Broadband Networks," Network Working Group, Internet-Draft, pp. 1-66, draft-ietf-ancp-protocol-10, IETF Trust, Reston, Virginia (Jul. 11, 2010).

* cited by examiner

METHOD AND APPARATUS FOR SERVICE CONTROL ON ACCESS NODE

CROSS-REFERENCE TO RELATED APPLICATIONS

This application is a continuation of International Patent Application No. PCT/CN2011/079583, filed on Sep. 13, 2011, which claims priority to Chinese Patent Application No. 201010562560.8, filed on Nov. 26, 2010, both of which are hereby incorporated by reference in their entireties.

FIELD OF THE INVENTION

The present invention relates to the network field, and in particular, to a method and an apparatus for service control on an access node.

BACKGROUND OF THE INVENTION

As a Layer 2 control protocol in broadband multi-service architecture, ANCP (Access Node Control Protocol, access node control protocol) aims to provide, at an access layer and a convergence layer, a set of general operation control planes related to QoS (Quality of Service, quality of service), a service, and a user. Because ANCP is extended based on GSMP (General Switch Management Protocol, general switch management protocol), a management domain is divided based on partitions, and an object joining the management domain is still limited to a physical port. With the development of broadband services, objects in the management domain need to be further subdivided, so as to satisfy a requirement for subdivision management of a user service in actual application of an existing network.

In a current protocol related to ANCP, only the physical port is supported as an object managed by a partition, while one physical port can belong to only one partition. With the subdivision of the broadband services and the popularization of PON (Passive Optical Network, passive optical network) access, ANCP, as a mechanism for an NAS (Network Access Server, network access server) to control an AN (Access Node, access node) access service, has too coarse granularity of physical port-based management, and is greatly limited in application.

SUMMARY OF THE INVENTION

Embodiments of the present invention provide a method and an apparatus for service control on an access node, so as to solve a problem that an NAS cannot effectively manage an access service of a device such as an AN due to too coarse granularity of objects managed by an ANCP partition.

In an aspect, an embodiment of the present invention provides a method for service control on an access node, where the access node is divided into at least one access node control protocol ANCP partition, and each ANCP partition corresponds to one network access server NAS. The method includes: obtaining, according to a set rule, a logical identifier of a physical object managed by an ANCP partition, where each logical identifier is used for identifying one physical object, and saving an obtained logical identifier in the ANCP partition; and obtaining, according to the logical identifier in the ANCP partition, an access topology of the physical object managed by the ANCP partition, and reporting the access topology in the ANCP partition to a corresponding NAS, so that the corresponding NAS performs service control according to a reported access topology.

In an aspect, an embodiment of the present invention further provides an access node, where the access node is divided into at least one access node control protocol ANCP partition, and each ANCP partition corresponds to one network access server NAS. The access node includes: an identifier obtaining unit, configured to obtain, according to a set rule, a logical identifier of a physical object managed by an ANCP partition, where each logical identifier is used for identifying one physical object, and save an obtained logical identifier in the ANCP partition; and a reporting unit, configured to obtain, according to the logical identifier in the ANCP partition, an access topology of the physical object managed by the ANCP partition, and report the access topology in the ANCP partition to a corresponding NAS, so that the corresponding NAS performs service control according to a reported access topology.

In an aspect, an embodiment of the present invention further provides a service control system, where the system includes an access node and at least one network access server NAS, and the access node is divided into at least one access node control protocol ANCP partition, and each ANCP partition corresponds to one NAS. The access node is configured to: obtain, according to a set rule, a logical identifier of a physical object managed by an ANCP partition, where each logical identifier is used for identifying one physical object; save an obtained logical identifier in the ANCP partition; obtain, according to the logical identifier in the ANCP partition, an access topology of the physical object managed by the ANCP partition; and report the access topology in the ANCP partition to a corresponding NAS. The NAS is configured to perform, according to a reported access topology, service control on a physical object managed by a corresponding ANCP partition.

Through the method and apparatus provided in the embodiments of the present invention, the problem that the NAS cannot effectively manage the access service of the device such as the AN due to too coarse granularity of objects managed by the ANCP partition is effectively solved.

BRIEF DESCRIPTION OF THE DRAWINGS

Accompanying drawings illustrated here are used for providing further understanding of the present invention, and are part of the application, but do not limit the present invention. In the accompanying drawings.

DETAILED DESCRIPTION OF THE
EMBODIMENTS

In order to make objectives, technical solutions and advantages of the present invention more comprehensible, embodiments of the present invention are further illustrated below in detail with reference to the embodiments and accompanying drawings. Here, the exemplary embodiments of the present invention and their illustration are only used for explaining the present invention, but shall not be construed as a limitation on the present invention.

Figure 1:
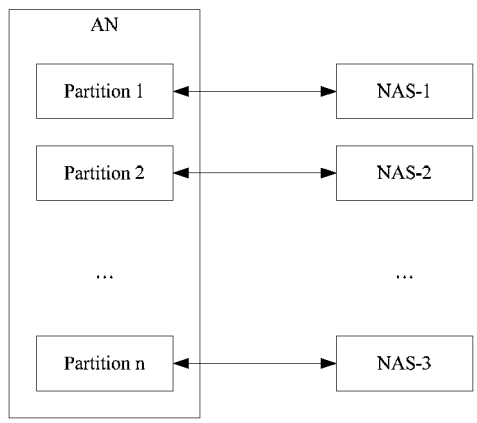
FIG. 1 is a schematic diagram of division of management partitions on an AN according to an embodiment of the present invention.

In order to clearly describe the solutions provided in the embodiments of the present invention, a scenario where the embodiments of the present invention are applied is described in the following. A provided scenario includes an AN and at least one NAS. The AN may access a plurality of services in a plurality of access manners In order to manage these services of different types, the AN may be divided into a plurality of management partitions, and each management partition may correspond to one NAS, as shown in FIG. 1. An ANCP partition is taken as an example of the management partition in this embodiment. The AN can manage at least one physical object, where the physical object in this embodiment may be a physical port PORT, an ONT (Optical Network Terminal, optical network terminal), an ONU (Optical Network Unit, optical network unit), a PVC (Permanent Virtual Circuit, permanent virtual circuit), a GEM (GPON Encapsulation Method, GPON (Gigabit Capable PON, gigabit capable PON) encapsulation method), an LLID (Logical Link Identifier, logical link identifier), and/or a service flow Flow, and so on.

Figure 2:
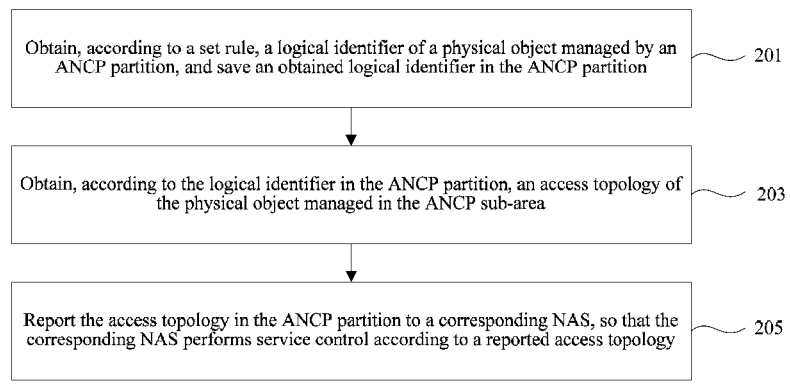
FIG. 2 is a flow chart of a method for service control on an access node according to an embodiment of the present invention.

FIG. 2 is a flow chart of a method for service control on an access node according to an embodiment of the present invention. Referring to FIG. 2, the method includes:

Step 201: Obtain, according to a set rule, a logical identifier of a physical object managed by an ANCP partition, and save an obtained logical identifier in the ANCP partition.

In this step, logical abstraction needs to be performed on the physical object managed by the ANCP partition, and a specific manner may be: obtaining, according to the set rule, the logical identifier corresponding to the physical object, and saving, in the ANCP partition, the obtained logical identifier as a logical object managed by the ANCP partition, where each logical identifier is used for identifying one physical object. In this embodiment, the set rule may be an existing IfIndex abstraction method, where a high byte of an integer represents a type of the logical object, and a low byte of the integer represents an identifier of the logical object. The set rule may also be according to location information of the physical object on an AN and/or a label ID of the physical object, and may also be other rules.

In an example of the location information of the physical object on the AN and/or the label ID of the physical object, obtained logical identifiers of different physical objects may be as follows:

A logical identifier of a physical port PORT may be a frame number and a slot number on the AN, and/or a port number on the AN.

A logical identifier of an ONT may be a frame number and a slot number on the AN, a port number on the AN, and/or an ONT-ID.

A logical identifier of an ONU may be a frame number and a slot number on the AN, a port number on the AN, and/or an ONU-ID.

A logical identifier of a PVC may be a frame number and a slot number on the AN, a port number on the AN, a VPI, and/or a VCI.

A logical identifier of a GEM may be a frame number and a slot number on the AN, a port number on the AN, and/or a GEM-ID.

A logical identifier of an LLID may be a frame number and a slot number on the AN, a port number on the AN, and/or an LLID.

A logical identifier of a Flow may be a frame number and a slot number on the AN, a port number on the AN, a VPI, and/or a FlowID; may be a frame number and a slot number on the AN, a port number on the AN, a VPI, and/or a C-VLAN; and may also be a frame number and a slot number on the AN, a port number on the AN, a VPI, and/or an ONT/GEM/C-VLAN; and may also be a FlowID.

In an embodiment, logical identifiers corresponding to physical objects of a same type may also be saved in one ANCP partition, so as to facilitate management.

Step 203: Obtain, according to the logical identifier in the ANCP partition, an access topology of the physical object managed in the ANCP partition.

Figure 3:
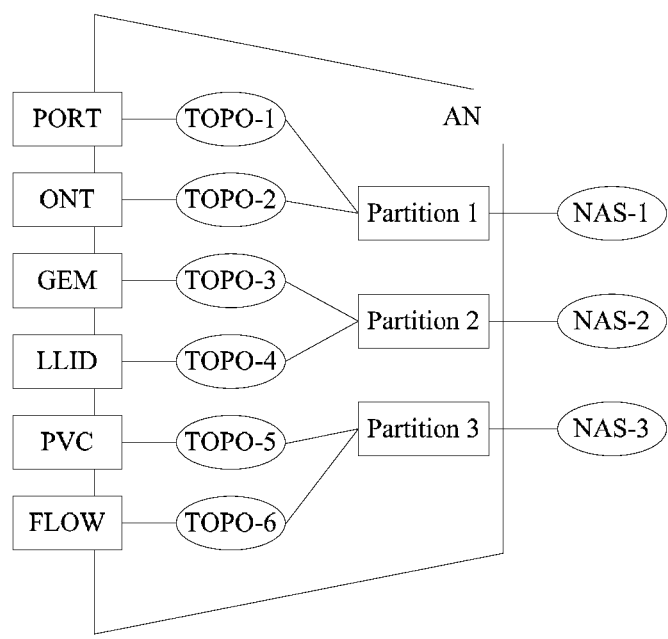
FIG. 3 is a schematic structural diagram of an access topology in an ANCP partition.

After the logical abstraction is performed on the physical object managed by the ANCP partition by using the foregoing method, the access topology in the ANCP partition is obtained according to an abstracted logical identifier. The access topology here may be a topological structure reflecting a connection relation between a customer premises equipment and the AN. As shown in FIG. 3, TOPO-1 corresponds to the PORT, TOPO-2 corresponds to the ONT, TOPO-3 corresponds to the GEM, TOPO-4 corresponds to the LLID, TOPO-5 corresponds to the PVC, and TOPO-6 corresponds to the Flow. An access topology in each ANCP partition may be identified by adopting a CID (Circuit ID, circuit identifier).

Step 205: Report the access topology in the ANCP partition to a corresponding NAS, so that the corresponding NAS performs service control according to a reported access topology.

In this embodiment, when an adjacency relation is established in the ANCP partition, or a rate of the access topology on the AN is changed, the AN needs to report the access topology on the ANCP partition to the corresponding NAS, so that the NAS performs control related to QoS, a service, and a user.

In this embodiment, the AN may construct an ANCP PORT UP (ANCP topology normal) message, and report the access topology in the ANCP partition to the corresponding NAS. The access topology in this embodiment may be included in the CID.

When reporting a topological relation of a current node to the NAS, the AN constructs CID content in the ANCP PORT UP message according to the logical identifier in the ANCP partition. If the logical identifier joining the ANCP partition corresponds to a physical port, the CID content may be "anid atm frame/slot/port", "anid eth frame/slot/port", or "anid pon frame/slot/port"; if the logical identifier joining the ANCP partition corresponds to a PVC, the CID content may be "anid atm frame/slot/port:vpi.vci"; if the logical identifier joining the ANCP partition corresponds to a Flow, the CID content may be "anid eth frame/slot/port[:vlan-id]".

Figure 4:
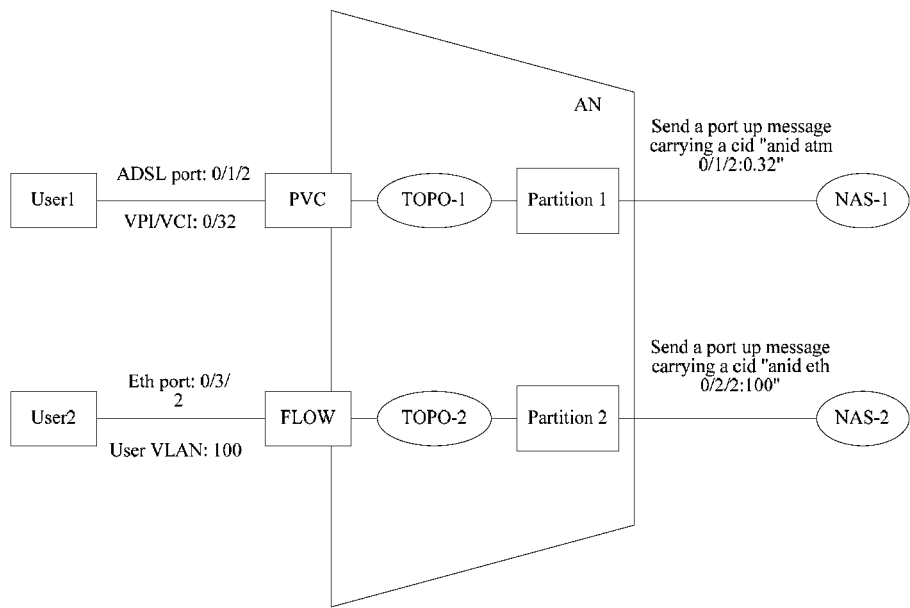
FIG. 4 is a schematic diagram of reporting an access topology according to a method in an embodiment.

In FIG. 4, TOPO-1 in a partition 1 is an access topology of the PVC, therefore, a CID constructed by the AN is "anid atm 0/1/2:0.32", and an ANCP PORT UP message including the CID is sent to corresponding NAS-1; TOPO-2 in a partition 2 is an access topology of the Flow, therefore, a CID constructed by the AN is "anid eth 0/2/2:100", and an ANCP PORT UP message including the CID is sent to corresponding NAS-2. It can be seen from FIG. 4 that, in this embodiment, an access manner corresponding to the PVC is an ADSL (Asymmetric Digital Subscriber Line, asymmetric digital subscriber line) port, and an access manner corresponding to the Flow is an Eth (Ethernet, Ethernet) port.

Through the method provided in the embodiment of the present invention, a problem of how to perform management through ANCP in a scenario where a user subscribes to different ISP (Internet Service Provider, Internet service provider) services is effectively solved, and meanwhile, a problem of how to implement ANCP management in a case that different ISPs have inconsistent granularity of objects managed by the ANCP is solved, which provides a broader prospect for application of ANCP in a multi-service scenario.

In an embodiment of reporting an access topology, a user may adopt an ADSL terminal or a VDSL (Very-High-Bit-Rate Digital Subscriber loop, very-high-bit-rate digital subscriber loop) terminal to access a network, an activation mode supported by a physical channel established between the ADSL terminal and the AN is an ATM (Asynchronous Transfer Mode, asynchronous transfer mode), and a physical channel established between the VDSL terminal and the AN can support the ATM and a PTM (Packet Transfer Mode, packet transfer mode), therefore, when the access topology obtained in the foregoing embodiment is reported to the NAS (or a BRAS (Broadband Remote Access Server, broadband remote access server)), an obtained access topology may be reported to the NAS by adopting a format corresponding to an activation mode of a physical channel connected to a user terminal.

Specifically:

(1) When the AN uses a VDSL single board, the user may adopt two kinds of user terminals, namely, the ADSL terminal or the VDSL terminal, to connect to the AN.

When the user terminal is in an activated state, the AN obtains an activation parameter of the physical channel connected to the user terminal by shaking hands with the user terminal, where the activation parameter includes one or a combination of a maximum delay, a maximum net rate, an interleaving depth, and an activation mode. The AN identifies the activation mode of the physical channel according to the activation parameter. If the activation mode is the ATM, reporting is performed according to an ATM format. For example, a CID of the ATM is constructed as "anid atm frame/slot/port", and so on. If the activation mode is the PTM, reporting is performed according to an ETH (Ethernet, Ethernet) format. For example, a CID of the ETH is constructed as "anid eth frame/slot/port", and so on.

When the user terminal is offline and in a non-activated state, the AN records an obtained activation parameter and/or activation mode when the user terminal is online last time, and reports an access topology of the user terminal according to a format corresponding to the activation mode of the last time when the user terminal is in the activated state; if the obtaining fails, reporting is performed according to the ETH format.

If the user terminal has never been activated, the AN reports, according to the ETH format, the access topology corresponding to the user terminal to the NAS (or BRAS).

(2) When the AN uses an ADSL single board, the user may use the ADSL terminal to connect to the AN.

When the user terminal is in an activated state, the AN obtains an activation parameter of the physical channel connected to the user terminal by shaking hands with the user terminal, and identifies the activation mode of the physical channel according to the activation parameter. In this case, an obtained activation mode is the ATM, and the AN reports an access topology of the user terminal according to an ATM format.

When the user terminal is in a non-activated state, the AN reports the access topology of the user terminal according to the ATM format.

In the method for reporting the access topology provided in this embodiment, the access topology of the physical object may be reported according to the format corresponding to the activation mode of the physical channel between the user terminal (physical object) and the AN, which facilitates service publication of an operator.

Figure 5:
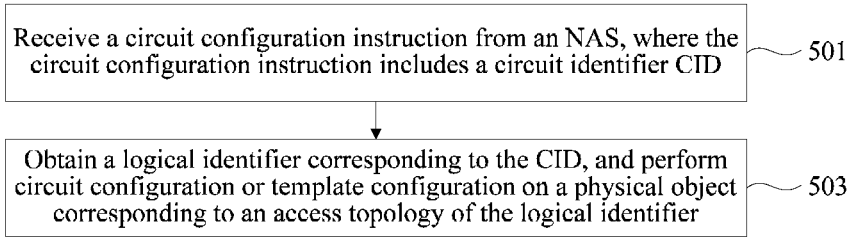
FIG. 5 is a flow chart showing that an AN performs circuit configuration according to a circuit configuration instruction of an NAS.

In an embodiment, if an NAS intends to perform circuit configuration on an access topology of an AN, referring to FIG. 5, the method in this embodiment further includes:

Step 501: Receive a circuit configuration instruction from the NAS, where the circuit configuration instruction includes a circuit identifier CID.

Step 503: Obtain a logical identifier corresponding to the CID, and perform circuit configuration or template configuration on a physical object corresponding to an access topology of the logical identifier.

Currently, the ANCP protocol supports only an activation circuit template that is based on configuration of an xDSL (all kinds of DSLs, Digital Subscriber Line, digital subscriber line) port, therefore, when the physical object corresponding to the access topology of the logical identifier is a physical port or a PVC or a service flow Flow, a circuit configuration action may be performed according to the CID delivered by the NAS. For example, according to the CID delivered by the NAS, it is found, by parsing, that a physical port performs the circuit configuration action. As ANCP application goes deep gradually, that only an activation rate of the physical port is configured cannot satisfy a requirement of service application. Therefore, when the physical object corresponding to the access topology of the logical identifier is an ONT/ONU, DBA (Dynamically Bandwidth Assignment, dynamically bandwidth assignment) template configuration may be performed according to the CID delivered by the NAS; when the physical object corresponding to the access topology of the logical identifier is the service flow Flow, traffic template configuration may be performed according to the CID delivered by the NAS. The foregoing descriptions are merely examples, and shall not be construed as a limitation on the embodiment.

Figure 6:
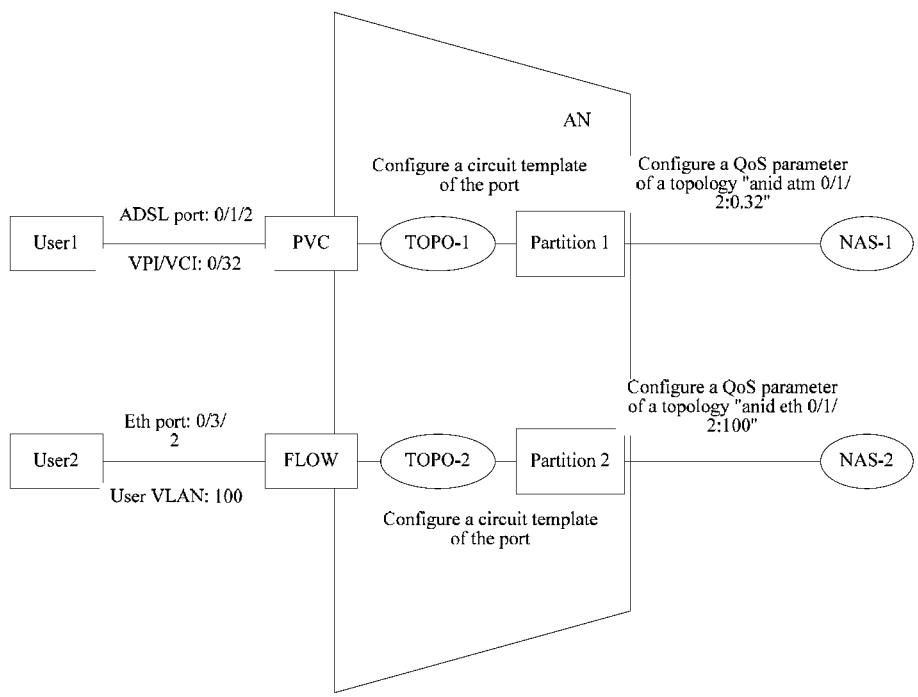
FIG. 6 is a schematic diagram showing that an AN performs circuit configuration according to a configuration instruction of an NAS.

FIG. 6 is a schematic diagram showing that an AN performs circuit configuration according to a configuration instruction of an NAS. Referring to FIG. 6, in this embodiment, after receiving a configuration instruction that is sent by NAS-1 and for configuring a QoS parameter of a topology "anid atm 0/1/2:0.32", the AN obtains, by parsing, a logical identifier TOPO-1 corresponding to the CID "anid atm 0/1/2:0.32", and then determines that a physical object corresponding to an access topology of the logical identifier TOPO-1 is a PVC. An access manner corresponding to the PVC is an ADSL, so the AN configures a circuit template of an ADSL port. After receiving a configuration instruction that is sent by NAS-2 and for configuring a QoS parameter of a topology "anid eth 0/1/2:100", the AN obtains, by parsing, a logical identifier TOPO-2 corresponding to the CID "anid eth 0/1/2:100", and then determines that a physical object corresponding to an access topology of the logical identifier TOPO-2 is a Flow. An access manner corresponding to the Flow is Eth, so the AN configures a QoS template of a service flow.

Through the method provided in the embodiment of the present invention, after subdividing objects managed by the ANCP partition, the AN may execute a circuit configuration instruction that the NAS delivers based on the topology, and find, according to the topology, a corresponding entity for operation. Therefore, a problem that an NAS cannot effectively manage an access service of a device such as an AN due to too coarse granularity of objects managed by an ANCP partition is effectively solved.

Figure 7:
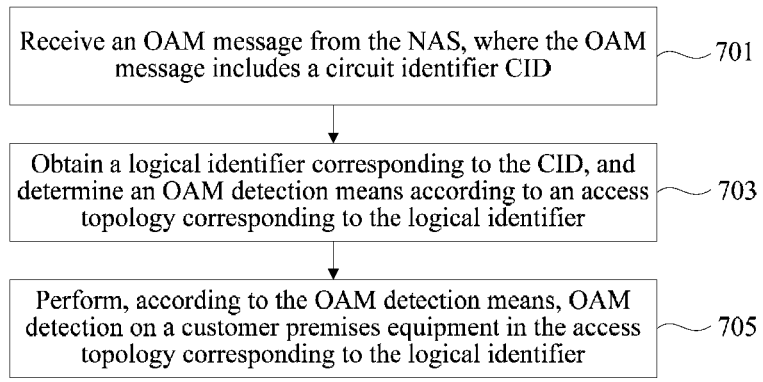
FIG. 7 is a flow chart showing that an AN performs OAM detection according to an OAM instruction of an NAS.

In an embodiment, if an NAS intends to perform OAM (Operation Administration and Maintenance, operation administration and maintenance) on an access topology of an AN, referring to FIG. 7, the method in this embodiment further includes:

Step 701: Receive an OAM message from the NAS, where the OAM message includes a circuit identifier CID.

Step 703: Obtain a logical identifier corresponding to the CID, and determine an OAM detection means according to an access topology corresponding to the logical identifier.

Step 705: Perform, according to the OAM detection means, OAM detection on a customer premises equipment in the access topology corresponding to the logical identifier.

The AN parses the OAM message sent by the NAS, to obtain a CID parameter and find a corresponding access topology, and then selects the OAM detection means according to the access topology, to fulfill an OAM detection function of a corresponding customer premises equipment.

When the logical identifier managed by the partition is an abstraction of a physical port, the OAM may be detection for a port state. When the logical identifier managed by the partition is an abstraction of a PVC, the OAM may be using a loopback cell (loopback cell) of an ATM (Asynchronous Transfer Mode, Asynchronous Transfer Mode) (F4 (Virtual Path, virtual path))/F5 (Virtual Channel, virtual channel) to complete detection of a state of a CPE (Customer premises equipment, customer premises equipment). When the logical identifier managed by the partition is an abstraction of an ONT/ONU, the OAM may be using a relevant mechanism of an OMCI (ONT management and control interface, ONT management and control interface) or a relevant mechanism of ETHOAM (Ethernet operation, administration and maintenance) to complete a connectivity check of the ONT/ONU. The foregoing descriptions are merely examples, and shall not be construed as a limitation on this embodiment.

Through the method provided in the embodiment of the present invention, after subdividing objects managed by the ANCP partition, the AN may execute an OAM instruction that the NAS delivers based on the topology, and find, according to the topology, a corresponding entity for operation. Therefore, a problem that an NAS cannot effectively manage an access service of a device such as an AN due to too coarse granularity of objects managed by an ANCP partition is effectively solved.

FIG. 5 and FIG. 7 are two application scenarios where after subdividing the objects managed by the ANCP partition, the AN performs the circuit configuration and the OAM instruction that are delivered, based on the topology, by the NAS, and finds, according to the logical identifier, the corresponding entity for operation. When the AN performs, after subdividing the objects managed by the ANCP partition, a multicast control instruction that the NAS delivers based on the topology, a similar method may be adopted to find a corresponding entity for operation, which is not repeatedly described here.

Figure 8:
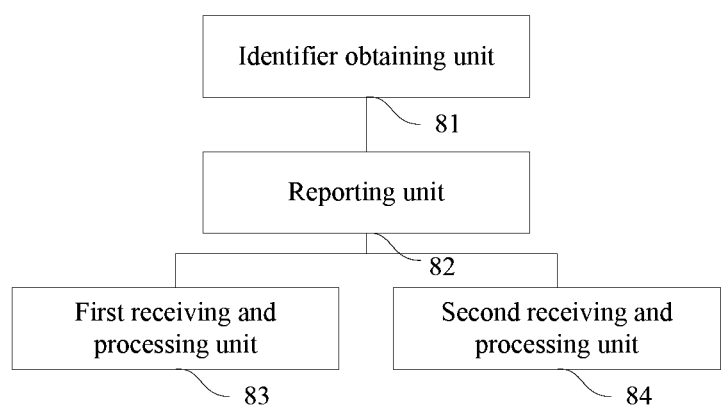
FIG. 8 is a composition block diagram of an access node according to an embodiment of the present invention.

FIG. 8 is a composition block diagram of an access node according to an embodiment of the present invention. Referring to FIG. 8, the access node includes:

an identifier obtaining unit 81, configured to: obtain, according to a set rule, a logical identifier of a physical object managed by an ANCP partition, where each logical identifier is used for identifying one physical object; and save an obtained logical identifier in the ANCP partition; and a reporting unit 82, configured to obtain, according to the logical identifier in the ANCP partition, an access topology of the physical object managed by the ANCP partition, and report the access topology in the ANCP partition to a corresponding NAS, so that the corresponding NAS performs service control according to a reported access topology.

In an embodiment, the access node further includes:

a first receiving and processing unit 83, configured to receive a circuit configuration instruction that is from the NAS and includes a circuit identifier CID, obtain a logical identifier corresponding to the CID, and perform circuit configuration or template configuration on a physical object corresponding to an access topology of the logical identifier.

In an embodiment, the access node further includes:

a second receiving and processing unit, configured to receive an operation, administration and maintenance OAM message that is from the NAS and includes a circuit identifier CID, obtain a logical identifier corresponding to the CID, determine an OAM detection means according to an access topology corresponding to the logical identifier, and perform, by adopting the OAM detection means, OAM detection on a customer premises equipment in the access topology corresponding to the logical identifier.

Components of the access node in this embodiment are configured to implement steps of the methods in the embodiments shown in FIG. 2, FIG. 5, and FIG. 7. The steps are described in detail in the embodiments shown in FIG. 2, FIG. 5, and FIG. 7, and therefore, are not repeatedly described here.

The access node provided in the embodiment of the present invention effectively solves a problem of how to perform management through ANCP in a scenario where a user subscribes to different ISP services, and meanwhile, solves a problem of how to implement ANCP management in a case that different ISPs have inconsistent granularity of objects managed by the ANCP, which provides a broader prospect for application of ANCP in a multi-service scenario.

Figure 9:
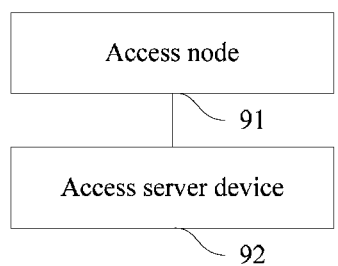
FIG. 9 is a composition block diagram of a service control system according to an embodiment of the present invention.

FIG. 9 is a composition block diagram of a service control system according to an embodiment of the present invention. Referring to FIG. 9, the system includes an access node 91 and at least one network access server NAS 92, where the access node 91 is divided into at least one access node control protocol ANCP partition, and each ANCP partition corresponds to one NAS.

The access node 91 is configured to: obtain, according to a set rule, a logical identifier of a physical object managed by an ANCP partition, where each logical identifier is used for identifying one physical object; save an obtained logical identifier in the ANCP partition; obtain, according to the logical identifier in the ANCP partition, an access topology of the physical object managed by the ANCP partition; and report the access topology in the ANCP partition to a corresponding NAS.

The access server device 92 is configured to perform, according to a reported access topology, service control on a physical object managed by a corresponding ANCP partition.

In this embodiment, the access node 91 may be implemented through the access node in the embodiment shown in FIG. 8. The access node is illustrated in detail in the embodiment shown in FIG. 8, and therefore, is not repeatedly described here.

Through the system provided in the embodiment of the present invention, the access node AN effectively solves a problem of how to perform management through ANCP in a scenario where a user subscribes to different ISP services, and meanwhile, solves a problem of how to implement ANCP management in a case that different ISPs have inconsistent granularity of objects managed by the ANCP, which provides a broader prospect for application of ANCP in a multi-service scenario.

Steps of the methods or algorithms described in combination with the embodiments disclosed in this document may be directly implemented by using hardware, a software module executed by a processor, or a combination of the two. The software module may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

The objectives, technical solutions, and beneficial effects of the present invention are described in further detail through the foregoing specific embodiments. It should be understood that, the foregoing descriptions are merely specific embodiments of the present invention, but not intended to limit the protection scope of the present invention. Any modification, equivalent replacement, or improvement made without departing from the spirit and principle of the present invention should fall within the protection scope of the present invention.

What is claimed is:

1. A method for service control on an access node, wherein the access node is divided into at least one access node control protocol (ANCP) partition, each ANCP partition managing a physical object, and each ANCP partition corresponding to at least one network access server (NAS), the method comprising:
    constructing an ANCP message comprising an access topology of the physical object; and
    reporting the access topology of the physical object to at least one corresponding NAS, wherein the access topology is carried on a circuit identifier (CID) field of the ANCP message, the CID field comprises an identifier of the access node and a logical identifier of the physical object, the physical object is a physical port or a permanent virtual circuit (PVC), the logical identifier is a slot number, frame number, port number, virtual channel identifier (VCI) or virtual path identifier (VPI),
    wherein when an activation mode between the access node and a user terminal is an asynchronous transfer mode (ATM), the ANCP message is based on an ATM format and when the activation mode between the access node and the user terminal is a packet transfer mode (PTM) the ANCP message is based on an Ethernet (ETH) format.

2. The method according to claim 1, further comprising accepting service control performed by the corresponding NAS, wherein accepting the service control performed by the corresponding NAS comprises:
    receiving, from the NAS, a circuit configuration instruction comprising the circuit identifier (CID);
    obtaining a logical identifier corresponding to the CID; and
    performing circuit configuration or template configuration on a physical object in an access topology corresponding to the logical identifier corresponding to the CID.

3. The method according to claim 1, further comprising accepting service control performed by the corresponding NAS, wherein accepting the service control performed by the corresponding NAS comprises:
    receiving, from the NAS, an operation, administration and maintenance (OAM) comprising the circuit identifier (CID);
    obtaining a logical identifier corresponding to the CID;
    determining an OAM detection means according to an access topology corresponding to the logical identifier corresponding to the CID; and
    performing, by adopting the OAM detection means, OAM detection on a customer premises equipment in the access topology corresponding to the logical identifier corresponding to the CID.

4. The method according to claim 1, wherein a logical identifier corresponding to a physical object of a same type is saved in the ANCP partition.

5. The method according to claim 1, wherein when the user terminal is in a non-activated state, reporting the access topology to the corresponding NAS further comprises:
    obtaining an activation mode of the last time when the user terminal was in an activated state;
    reporting the access topology of the at least one ANCP partition to the at least one corresponding NAS according to a corresponding format; and
    if the obtaining the activation mode of the last time when the user terminal is in the activated state fails, reporting the access topology of the at least one ANCP partition to the at least one corresponding NAS according to the Ethernet (ETH) format.

6. An access node, wherein the access node is divided into at least one access node control protocol (ANCP) partition, each ANCP partition managing a physical object each ANCP partition corresponding to at least one network access server (NAS), the access node comprising:
    processor, configured to construct an ANCP message comprising an access topology of the physical object; and
    a transmitter coupled to the processor, configured to report the access topology of the physical object to at least one of the corresponding NAS, wherein the access topology is carried on a circuit identifier (CID) field of the ANCP message, wherein the CID field comprises an identifier of the access node and a logical identifier of the physical object, wherein the physical object is a physical port or a permanent virtual circuit (PVC), wherein the logical identifier is slot number, frame number, port number, virtual channel identifier (VCI) or virtual path identifier (VPI),
    wherein when an activation mode between the access node and a user terminal is an asynchronous transfer mode (ATM), the ANCP message is based on an ATM format, and when the activation mode between the access node and a user terminal is a packet transfer mode (PTM), the ANCP message is based on Ethernet (ETH) format.

7. The access node according to claim 6, wherein the access node further comprises:
    a receiver, configured to receive a circuit configuration instruction from the at least one of the corresponding NAS that comprises the circuit identifier (CID), to obtain a logical identifier corresponding to the CID, and to perform circuit configuration or template configuration on a physical object corresponding to an access topology of the logical identifier corresponding to the CID.

8. The access node according to claim 6, wherein the access node further comprises:
    a receiver, configured to receive an operation, administration and maintenance (OAM) message from the at least one of the corresponding NAS that comprises the circuit identifier (CID), to obtain a logical identifier corresponding to the CID, to determine an OAM detection means according to an access topology corresponding to the logical identifier, and to perform, by adopting the OAM detection means, OAM detection on a customer premises equipment in the access topology corresponding to the logical identifier corresponding to the CID.

9. A service control system, wherein the system comprises an access node and at least one network access server (NAS), wherein the access node is divided into at least one access node control protocol (ANCP) partition, each ANCP partition managing a physical object, and each ANCP partition corresponding to at least one NAS, the system comprising:

the access node, configured to:
construct an ANCP message comprising an access topology of the physical object;
resort the access to solo of the physical object to at least one of the corresponding NAS, wherein the access topology is carried on a circuit identifier (CID) field of the ANCP message, wherein the CID field comprises an identifier of the access node and a logical identifier of the physical object, wherein the physical object is a physical port or a permanent virtual circuit (PVC) wherein the logical identifier is slot number frame number port number, virtual channel identifier (VCI) or virtual path identifier (VPI), wherein in when an activation mode between the access node and a user terminal is an asynchronous transfer mode (ATM) the ANCP message is based on an ATM format when the activation mode between the access node and the user terminal is a packet transfer mode (PTM) the ANCP message is based on an Ethernet (ETH) format; and the at least one NAS configured to perform according to the reported access topology service control on the physical object.

10. The method according to claim 1, wherein the NAS is broadband remote access server (BRAS).

11. The method according to claim 1, wherein the ANCP message is PORT UP message.

12. The access node according to claim 6, wherein the NAS is broadband remote access server (BRAS).

13. The access node according to claim 6, wherein the ANCP message is PORT UP message.

14. The service control system according to claim 9, wherein the NAS is broadband remote access server (BRAS).

* * * * *